(12) United States Patent
Iwamura et al.

(10) Patent No.: US 11,849,145 B2
(45) Date of Patent: Dec. 19, 2023

(54) IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 151 days.

(21) Appl. No.: 17/471,734

(22) Filed: Sep. 10, 2021

(65) Prior Publication Data

US 2021/0409764 A1    Dec. 30, 2021

Related U.S. Application Data

(63) Continuation of application No. PCT/JP2020/010326, filed on Mar. 10, 2020.

(30) Foreign Application Priority Data

Mar. 11, 2019  (JP) ................................. 2019-043965

(51) Int. Cl.
*H04N 19/593* (2014.01)
*H04N 19/105* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC .... H04N 19/11; H04N 19/105; H04N 19/593; H04N 19/12; H04N 19/61
See application file for complete search history.

(56) References Cited

U.S. PATENT DOCUMENTS 9,609,354 B2*  3/2017 Oh ....................... H04N 19/124
10,575,003 B2*  2/2020 Sasai ...................... H04N 19/91
(Continued)

FOREIGN PATENT DOCUMENTS

| WO | 2017/165395 A1 | 9/2017 |
| WO | 2017/165509 A1 | 9/2017 |
| WO | 2018/231488 A1 | 12/2018 |

OTHER PUBLICATIONS

Position Dependent Intra Prediction Combination—Qualcomm; Said; et al.—2015; (Year: 2015).*

(Continued)

*Primary Examiner* — Luis Perez-Fuentes
(74) *Attorney, Agent, or Firm* — Studebaker & Brackett PC

(57) ABSTRACT

An image encoding device 1 that encodes an encoding target block obtained by dividing an image, the image encoding device including: an intra predictor 172 configured to predict the encoding target block through intra prediction to generate a prediction block; and a transformer 121 configured to perform orthogonal transform processing on a prediction residual representing an error of the prediction block with respect to the encoding target block. The intra predictor includes: a weighted controller 172c configured to control the weighted combining processing dependent on positions of prediction pixels within the prediction block based on a type of transform to be applied in the orthogonal transform processing in the transformer; and a corrector 172b configured to correct the prediction pixels by performing the weighted combining processing on reference pixels adjacent to the encoding target block and the prediction pixels.

2 Claims, 7 Drawing Sheets

(51) Int. Cl.
  *H04N 19/61* (2014.01)
  *H04N 19/11* (2014.01)
  *H04N 19/119* (2014.01)
  *H04N 19/13* (2014.01)
  *H04N 19/176* (2014.01)

(52) U.S. Cl.
  CPC ........... *H04N 19/119* (2014.11); *H04N 19/13* (2014.11); *H04N 19/176* (2014.11); *H04N 19/61* (2014.11)

(56) References Cited

U.S. PATENT DOCUMENTS

| | | | | |
|---|---|---|---|---|
| 11,057,622 | B2* | 7/2021 | Van der Auwera | H04N 19/593 |
| 11,115,676 | B2* | 9/2021 | Zhang | H04N 19/159 |
| 11,343,518 | B2* | 5/2022 | Sasai | H04N 19/105 |
| 11,368,690 | B2* | 6/2022 | Lee | H04N 19/176 |
| 11,483,564 | B2* | 10/2022 | Lee | H04N 19/157 |
| 11,611,742 | B2* | 3/2023 | Lee | H04N 19/463 |

OTHER PUBLICATIONS

Simplification and Extension of PDPC, 8th JVET Meeting; Zhao; et al.—Oct. 18, 2017; (Year: 2017).*
Extension of Simplified PDPC to Diagonal Intra Modes; Auwera; et al.—Apr. 10, 2018; (Year: 2018).*
Test Model 3 of VVC; Chen; et al.—2018; (Year: 2018).*
International Search Report issued in PCT/JP2020/010326; dated Jun. 9, 2020.
Jianle Chen et al. "Algorithm Description of Joint Exploration Test Model 5" Joint Video Exploration Team (JVET) of ITU-T SG 16 WP 3 and ISO/IEC JTC 1/SC 29/WG 11, Document: JVET-E1001-v1, 5th Meeting: Geneva, CH, Jan. 12-20, 2017, pp. 1-41.
Benjamin Bross et al. "Versatile Video Coding (Draft 3)" Joint Video Experts Team (JVET) of ITU-T SG 16 WP 3 and ISO/IEC JTC 1/SC 29/WG 11, Document: JVET-L1001-v3, 12th Meeting: Macao, China, Oct. 3-12, 2018, pp. 2-3.

* cited by examiner

FIG. 2

| Transform Type | Basis function $T_i(j)$, $i,j = 0, 1, \cdots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> where, $\omega_0 = \begin{cases} \sqrt{\dfrac{2}{N}} & i = 0 \\ 1 & i \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

FIG. 3

| MTS_CU_flag | MTS_Hor_flag | MTS_Ver_flag | | |
|---|---|---|---|---|
| | | | Horizontal | Vertical |
| 0 | | | DCT2 | |
| 1 | 0 | 0 | DST7 | DST7 |
| 1 | 0 | 1 | DST7 | DCT8 |
| 1 | 1 | 0 | DCT8 | DST7 |
| 1 | 1 | 1 | DCT8 | DCT8 |

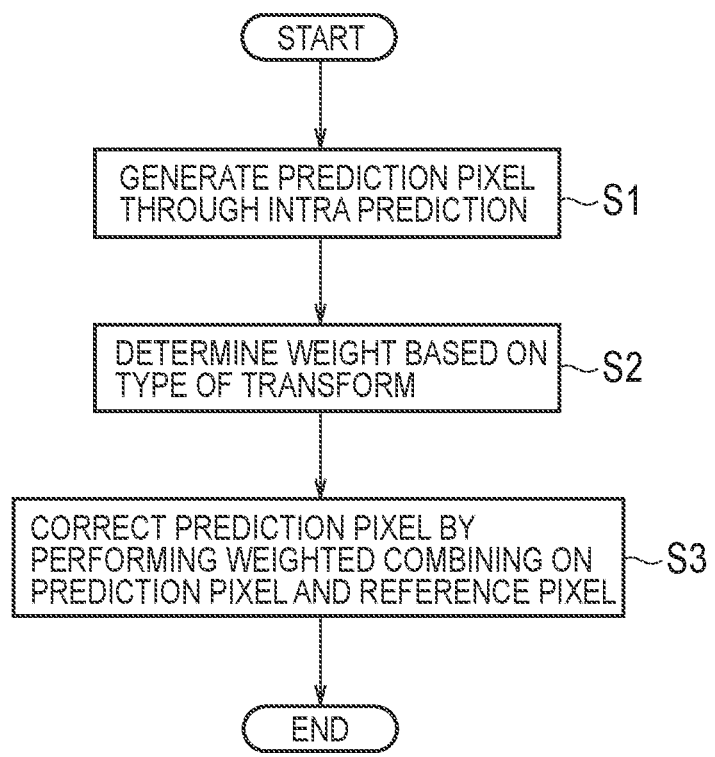

IMAGE ENCODING DEVICE, IMAGE DECODING DEVICE AND PROGRAM

RELATED APPLICATIONS

The present application is a continuation based on PCT Application No. PCT/JP2020/010326, filed on Mar. 10, 2020, which claims the benefit of Japanese Patent Application No. 2019-043965 filed on Mar. 11, 2019. The content of which is incorporated by reference herein in their entirety.

TECHNICAL FIELD

The present disclosure relates to an image encoding device, an image decoding device and a program.

BACKGROUND ART

In image encoding technique, intra prediction utilizing spatial correlation within a frame is widely used. In the intra prediction, a prediction block is generated by predicting respective pixels within an encoding target block with reference to pixels within a reference block (hereinafter, referred to as "reference pixels") that is a decoded block adjacent to the encoding target block.

An image encoding device generates a transformation coefficient by performing orthogonal transform processing on a prediction residual representing an error of the prediction block with respect to the encoding target block, quantizes and entropy encodes the transform coefficient and outputs encoded data.

In recent years, MPEG (Moving Picture Experts Group) and ITU (International Telecommunication Union) have been advancing standardization of VVC (Versatile Video Coding) that is a next generation video encoding scheme (see, for example, Non Patent Literature 1).

Draft standards of the VVC enable transform that is more suitable for characteristics of a prediction residual by selectively applying a total of three types of orthogonal transform including DCT (Discrete Cosine Transform) 2, DST (Discrete Sine Transform) 7 and DCT 8 for each encoding target block in orthogonal transform processing.

Further, the draft standards of the VVC employ a method called PDPC (Position Dependent intra Prediction Combination) as a method for correcting a prediction block to be generated through intra prediction.

In the PDPC, prediction pixels are corrected by performing weighted combining processing dependent on positions of the prediction pixels on the prediction pixels within the prediction block and reference pixels within a reference block. This improves prediction accuracy in an area near the reference block within the prediction block, so that it is possible to reduce energy of the prediction residual in an area near the reference block.

CITATION LIST

Non Patent Literature

Non Patent Literature 1: JVET-L1001 "Versatile Video Coding (Draft 3)"

SUMMARY OF INVENTION

An image encoding device according to a first feature that encodes an encoding target block obtained by dividing an image. The image encoding device including: an intra predictor configured to predict the encoding target block through intra prediction to generate a prediction block; a transform controller configured to control transform processing to be performed on a prediction residual that represents an error of the prediction block with respect to the encoding target block; a transformer configured to perform transform processing on the prediction residual based on control by the transform controller; and an entropy encoder configured to entropy encode control information of transform processing by the transform controller as a control flag. The intra predictor includes: a combining processing controller configured to control weighted combining processing dependent on positions of prediction pixels within the prediction block based on the control flag; and a corrector configured to correct the prediction pixels by performing the weighted combining processing on reference pixels adjacent to the encoding target block and the prediction pixels.

An image decoding device according to a second feature that decodes a decoding target block obtained by dividing and encoding an image. The image decoding device including: an entropy decoder configured to decode a control flag that is entropy encoded on an encoding side as control information of transform processing; an inverse transform controller configured to control inverse transform processing to be performed on a transform coefficient corresponding to the decoding target block based on the control flag; an inverse transformer configured to perform inverse transform processing on the transform coefficient corresponding to the decoding target block based on control by the inverse transform controller; and an intra predictor configured to predict the decoding target block through intra prediction to generate a prediction block. The intra predictor includes: a combining processing controller configured to control weighted combining processing dependent on positions of prediction pixels within the prediction block based on the control flag; and a corrector configured to correct the prediction pixels by performing the weighted combining processing on reference pixels adjacent to the decoding target block and the prediction pixels.

A program according to a third feature causes a computer to function as the image encoding device according to the first feature.

A program according to a fourth feature causes a computer to function as the image decoding device according to the second feature.

BRIEF DESCRIPTION OF DRAWINGS

FIG. 2 is a diagram illustrating bases (basis functions) of a total of three types of transform of DCT 2 (DCT-II), DCT 8 (DCT-VIII) and DST 7 (DST-VII).

FIG. 3 is a diagram illustrating a control flag to be output by a transform determiner according to the embodiment.

FIG. 7 is a diagram illustrating an example of operation flow of the intra predictor according to the embodiment.

DESCRIPTION OF EMBODIMENTS

The DST 7 is transform in which an impulse response includes a basis that monotonically increases. Thus, in a case where orthogonal transform processing is performed while applying the DST 7 to a prediction residual in which energy in an area near the reference block is small and energy in an area far from the reference block is large, concentrating the transform coefficient in a low range is highly effective.

Meanwhile, the DCT 8 is transform in which an impulse response includes a basis that monotonically decreases. Thus, in a case where orthogonal transform processing is performed while applying the DCT 8 to a prediction residual in which energy in an area near the reference block is large and energy in an area far from the reference block is small, concentrating the transform coefficients in a low range is highly effective.

However, in a case where the DCT 8 is applied in the orthogonal transform processing, if correction is performed so that energy in an area near the reference block becomes smaller through the PDPC, there is a problem that an effect of the DCT 8 is impaired and encoding efficiency can degrade.

Thus, the present disclosure is directed to improving encoding efficiency.

An image encoding device and an image decoding device according to a present embodiment are described with reference to the accompanying drawings. The image encoding device and the image decoding device according to the present embodiment encode and decode videos such as MPEG videos. In the description of the drawings below, the same or similar reference signs are used for the same or similar parts.

<Configuration of Image Encoding Device>

Figure 1:
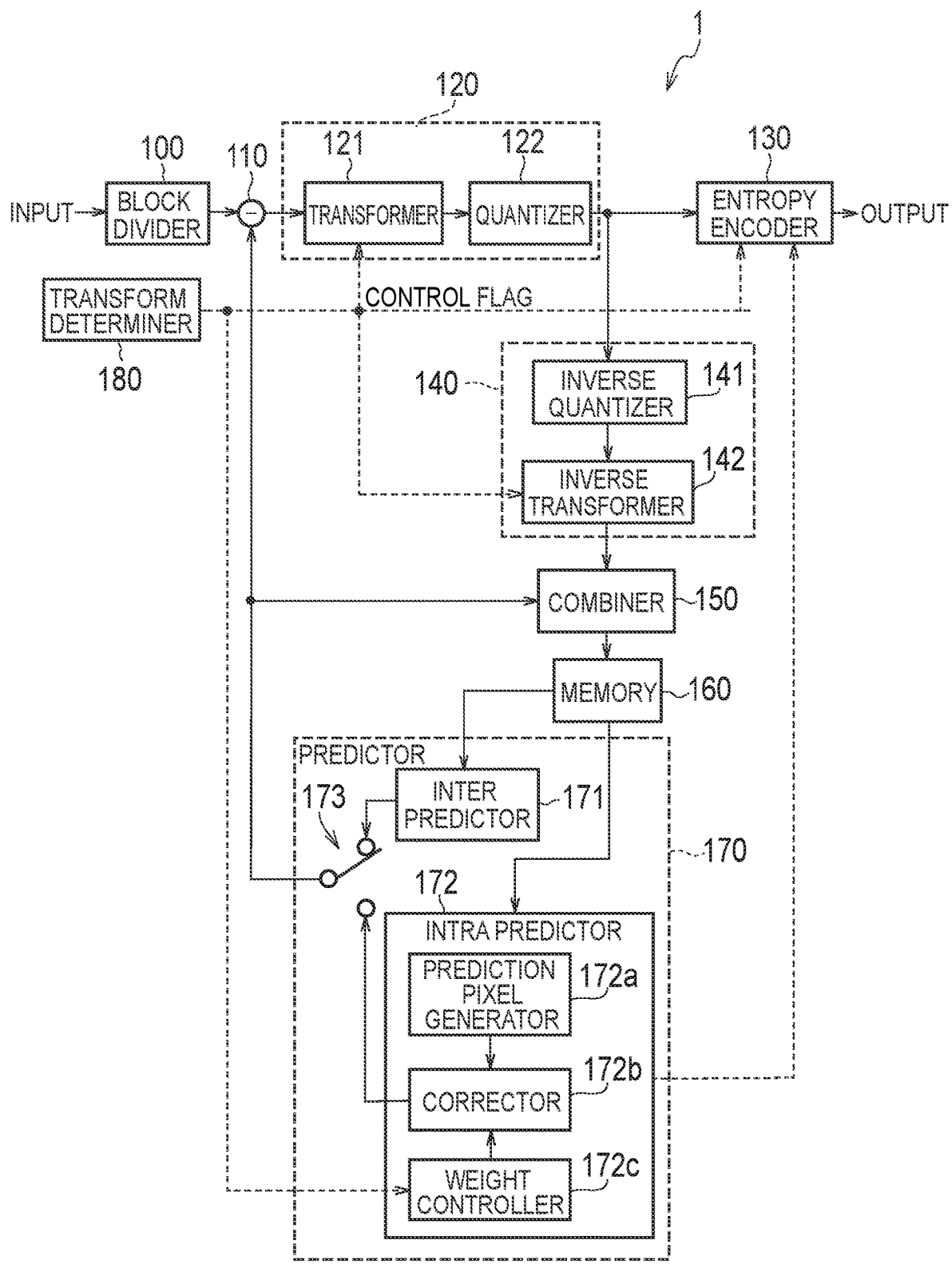
FIG. 1 is a diagram illustrating a configuration of an image encoding device according to an embodiment.

First, the image encoding device according to the present embodiment is described. FIG. 1 is a diagram illustrating a configuration of the image encoding device 1 according to the present embodiment.

As illustrated in FIG. 1, an image encoding device 1 includes a block divider 100, a subtractor 110, a transformer/quantizer 120, an entropy encoder 130, an inverse quantizer/inverse transformer 140, a combiner 150, a memory 160, a predictor 170 and a transform determiner 180. In the present embodiment, the transform determiner 180 corresponds to a transform controller.

The block divider 100 divides an original image that is an input image in s of a frame (or picture) that constitutes a moving image into a plurality of image blocks and outputs the image blocks obtained through division to the subtractor 110. A size of the image block is, for example, 32×32 pixels, 16×16 pixels, 8×8 pixels, 4×4 pixels, or the like. A shape of the image block is not limited to a square and may be a rectangle.

The image block is a unit (encoding target block) in which the image encoding device 1 performs encoding and is a unit (decoding target block) in which an image decoding device performs decoding. Such an image block is sometimes referred to as a CU (Coding Unit).

The subtractor 110 calculates prediction residuals that represent differences (errors) between an encoding target block inputted from the block divider 100 and a prediction block obtained by the predictor 170 predicting the encoding target block. Specifically, the subtractor 110 calculates a prediction residual by subtracting each pixel value in the prediction block from each pixel value in the encoding target block, and outputs the calculated prediction residuals to the transformer/quantizer 120.

The transformer/quantizer 120 executes an orthogonal transform process and a quantization process in units of the encoding target block. The transformer/quantizer 120 includes a transformer 121 and a quantizer 122.

The transformer 121 calculates transform coefficients by performing the orthogonal transform process on the prediction residuals inputted from the subtractor 110, and outputs the calculated transform coefficients to the quantizer 122. Orthogonal transform is, for example, discrete cosine transform (DCT), discrete sine transform (DST), Karhunen Loeve transform (KLT), or the like.

The orthogonal transform processing includes horizontal transform processing of performing orthogonal transform in a horizontal direction, and vertical transform processing of performing orthogonal transform in a vertical direction.

The transform determiner 180 determines a type of transform to be applied in the horizontal transform processing and the vertical transform processing and outputs a control flag indicating the determined type of transform to the transformer 121, the inverse transformer 142 and the entropy encoder 130.

The transformer 121 performs the horizontal transform processing and the vertical transform processing in accordance with the control flag that is input from the transform determiner 180 for each encoding target block. In other words, the transformer 121 applies orthogonal transform while switching the orthogonal transform among a plurality of types of orthogonal transform.

In the present embodiment, the transform determiner 180 determines one type of transform among a total of three types of orthogonal transform of DCT 2, DCT 8 and DST 7 for each of the horizontal transform processing and the vertical transform processing.

FIG. 2 is a view illustrating bases (basis functions) of a total of three types of transform of DCT 2 (DCT-II), DCT 8 (DCT-VIII) and DST 7 (DST-VII). In FIG. 2, N represents a size of the encoding target block.

The DCT 8 corresponds to a first type of transform in which an impulse response includes a basis that monotonically decreases. Specifically, the DCT 8 is transform in which an impulse response $T_0(j)$ of a lowest pass filter monotonically decreases (where j=0, . . . , N−1). The DCT 8 is transform in which one end of a transform basis waveform has a great value and is open. Transform having such characteristics of the basis is sometimes referred to as "transform in which one end point is open".

The DST 7 corresponds to a second type of orthogonal transform in which an impulse response includes a basis that monotonically increases. Specifically, the DST 7 is transform in which an impulse response $T_0(j)$ of a lowest pass filter monotonically increases (where j=0, . . . , N−1). The DST 7 is transform in which one end of a transform basis waveform is closed. Transform having such characteristics of the basis is sometimes referred to as "transform in which one end point is closed".

While in the present embodiment, description will be provided using an example where three types of orthogonal transform of DCT 2, DCT 8 and DST 7 are employed as a plurality of types of orthogonal transform to be applied to a prediction residual, any type of orthogonal transform may be adopted as long as the orthogonal transform can be selectively switched among a plurality of types of transform processing to be applied. The plurality of types of transform processing include transform processing (for example, transform including a basis that has characteristics of monotonically increasing or monotonically decreasing) as described above. Thus, a plurality of types of orthogonal transform to be applied to the prediction residual are not limited to these three types of transform. For example, other DCT and DST such as DCT 1 and DCT 5 may be used, transform may be skipped without transform processing employed in draft standards of HEVC and VVC being performed, or transform such as discrete wavelet transform may be used.

FIG. 3 is a view illustrating a control flag to be output by the transform determiner 180 according to the present embodiment.

As illustrated in FIG. 3, the transform determiner 180 outputs a total of three control flags of MTS_CU_flag, MTS_Hor_flag and MTS_Ver_flag.

In a case where the DCT 2 is applied to both the horizontal transform processing and the vertical transform processing, the transform determiner 180 sets MTS_CU_flag=0.

Meanwhile, there is a case where the transform determiner 180 applies the DCT 8 or the DST 7 to at least one of the horizontal transform processing or the vertical transform processing. In this case, the transform determiner 180 sets MTS_Hor_flag and MTS_Ver_flag in accordance with combination of types of transform to be applied in the horizontal transform processing and the vertical transform processing.

These three control flags are subjected to entropy encoding processing by the entropy encoder 130 that will be described later and stream-output. However, in a case of MTS_CU_flag=0, MTS_Hor_flag and MTS_Ver_flag do not have to be stream-output.

Returning to FIG. 1, the quantizer 122 quantizes the transform coefficient input from the transformer 121 using a quantization parameter and a quantization matrix and outputs a quantization transform coefficient that is a quantized transform coefficient to the entropy encoder 130 and the inverse quantizer/inverse transformer 140.

The entropy encoder 130 performs entropy encoding on the quantization transform coefficient input from the quantizer 122, compresses data to generate encoded data (bit stream) and outputs the encoded data to outside of the image encoding device 1. Here, a Huffman code, CABAC (Context-based Adaptive Binary Arithmetic Coding), or the like, can be used in entropy encoding.

Note that the entropy encoder 130 receives input of information such as a syntax regarding prediction from the predictor 170 and also entropy encodes the input information. Further, the entropy encoder 130 also entropy encodes the above-described control flag.

The inverse quantizer/inverse transformer 140 executes an inverse quantization process and an inverse orthogonal transform process in units of the encoding target block. The inverse quantizer/inverse transformer 140 includes an inverse quantizer 141 and an inverse transformer 142.

The inverse quantizer 141 performs inverse quantization processing corresponding to the quantization processing performed by the quantizer 122. Specifically, the inverse quantizer 141 restores the transform coefficient by inversely quantizing the transform coefficient input from the quantizer 122 using the quantization parameter and the quantization matrix and outputs a restoration transform coefficient that is the restored transform coefficient to the inverse transformer 142.

The inverse transformer 142 performs inverse orthogonal transform processing corresponding to the orthogonal transform processing performed by the transformer 121. For example, in a case where the transformer 121 performs DCT, the inverse transformer 142 performs inverse DCT. The inverse transformer 142 restores the prediction residual by performing inverse orthogonal transform processing on the restoration transform coefficient input from the inverse quantizer 141 and outputs a restoration prediction residual that is the restored prediction residual to the combiner 150.

The combiner 150 combines the restoration prediction residual input from the inverse transformer 142 with the prediction block input from the predictor 170 in pixel unit. The combiner 150 adds respective pixel values of the restoration prediction residual and respective pixel values of the prediction block to reconstruct (decode) the encoding target block and outputs the decoded image in block unit to the memory 160. Such a decoded image is sometimes referred to as a reconstructed image (reconstructed block).

The memory 160 stores the decoded image inputted from the combiner 150. The memory 160 stores decoded images in units of frames. The memory 160 outputs stored decoded images to the predictor 170. Note that a loop filter may be provided between the combiner 150 and the memory 160.

The predictor 170 performs prediction in units of the encoding target block. The predictor 170 includes an inter predictor 171, an intra predictor 172 and a switch 173.

The inter predictor 171 calculates a motion vector through a method such as block matching using the decoded image stored in the memory 160 as a reference image. Further, the inter predictor 171 predicts an encoding target block to generate an inter prediction block and outputs the generated inter prediction block to the switch 173.

The inter predictor 171 selects an optimal inter prediction method among inter prediction (typically, bi-prediction) using a plurality of reference images and inter prediction (single direction prediction) using one reference image and performs inter prediction using the selected inter prediction method. The inter predictor 171 outputs information (such as a motion vector) regarding inter prediction to the entropy encoder 130.

The intra predictor 172 generates an intra prediction block with reference to decoded reference pixels around the encoding target block among the decoded image stored in the memory 160 and outputs the generated intra prediction block to the switch 173. Further, the intra predictor 172 outputs a syntax regarding the selected prediction mode to the entropy encoder 130.

The intra predictor 172 selects an optimal prediction mode to be applied to the encoding target block among a plurality of prediction modes and predicts the encoding target block using the selected prediction mode.

Figure 4:
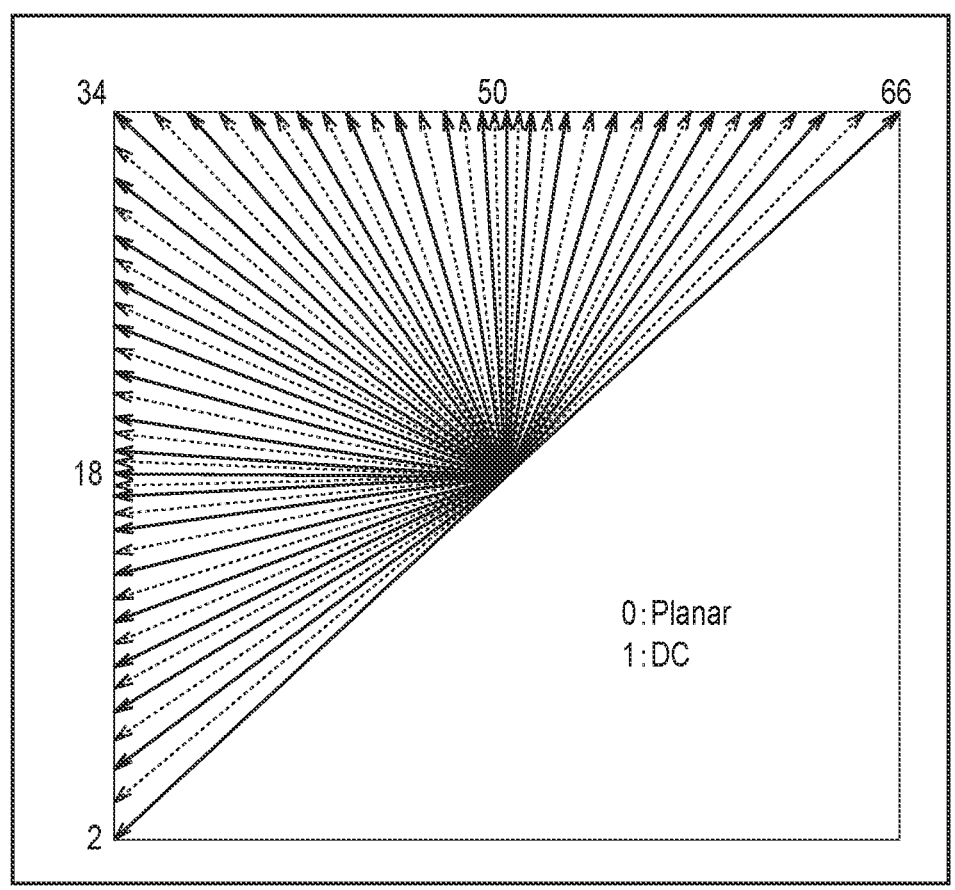
FIG. 4 is a diagram illustrating an intra prediction modes at an intra predictor according to the embodiment.

FIG. 4 is a view illustrating the intra prediction modes at the intra predictor 172 according to the present embodiment. As illustrated in FIG. 4, there are 67 prediction modes from 0 to 66. A mode "0" of the prediction mode is Planar prediction, a mode "1" of the prediction mode is DC prediction, and modes "2" to "66" of the prediction modes are directional prediction. In the directional prediction, a direction of an arrow indicates a prediction direction, a point of origin of an arrow indicates a position of a pixel to be predicted, and an end point of an arrow indicates a position of a reference pixel to be used for prediction of the pixel to be predicted. The modes "2" to "33" are prediction modes that mainly refer to reference pixels on a left side of the target block of intra prediction. Meanwhile, the modes "35" to "66" are prediction modes that mainly refer to reference pixels on an upper side of the target block of intra prediction.

The switch 173 switches the prediction block between the inter prediction block input from the inter predictor 171 and the intra prediction block input from the intra predictor 172 and outputs one of the prediction blocks to the subtractor 110 and the combiner 150.

In the present embodiment, the intra predictor 172 includes a prediction pixel generator 172a, a corrector 172b and a weight controller 172c. The weight controller 172c corresponds to a combining processing controller.

The prediction pixel generator 172a predicts respective pixel values within the encoding target block through intra prediction using one of the above-described intra prediction modes, generates a prediction block including the prediction pixels and outputs the generated prediction block to the corrector 172b.

The corrector 172b corrects the prediction pixels by performing weighted combining processing dependent on positions of the prediction pixels on the prediction pixels within the prediction block input from the prediction pixel generator 172a and the reference pixels adjacent to the encoding target block. The corrector 172b outputs the corrected prediction block (intra prediction block) including the corrected prediction pixels to the switch 173.

In the present embodiment, the corrector 172b corrects the prediction pixels within the prediction block through PDPC. The PDPC is an example of weighted combining processing.

Figure 5:
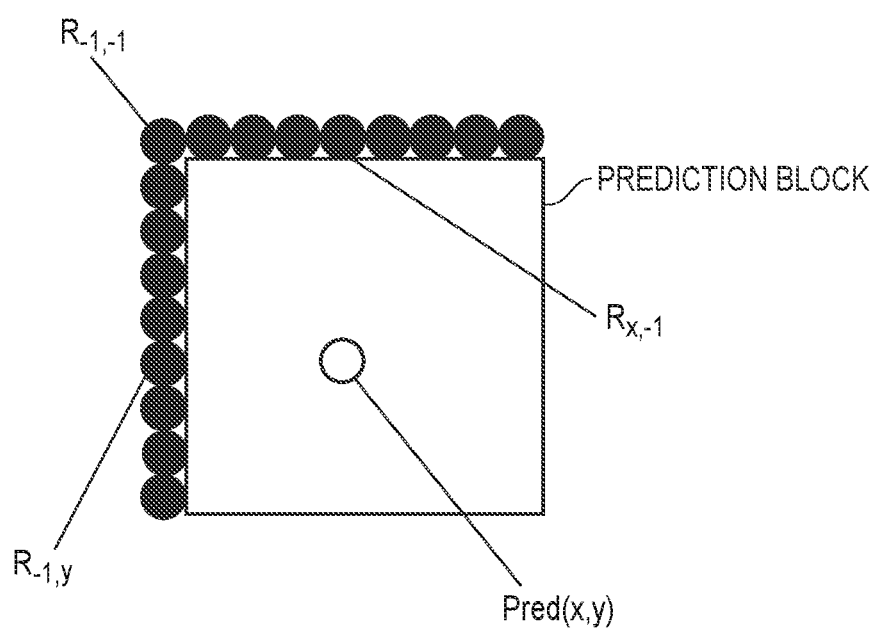
FIG. 5 is a diagram illustrating a weighted combining processing (PDPC) according to the embodiment.

FIG. 5 is a view illustrating the PDPC according to the present embodiment. As illustrated in FIG. 5, the PDPC corrects prediction pixels pred(x, y) within the generated prediction block by weighting a reference pixel $(R_{x,\,-1})$ on an upper side, a reference pixel $(R_{-1,\,y})$ on a left side, and a reference pixel $(R_{-1,\,-1})$ on an upper left side at specific ratios in accordance with coordinates (x, y) of the prediction pixels. Then, the PDPC obtains the corrected prediction pixels pred'(x, y).

In the present embodiment, the reference pixel $(R_{x,\,-1})$ on the upper side corresponds to a vertical reference pixel adjacent to the encoding target block in a vertical direction. The reference pixel $(R_{-1,\,y})$ on the left side corresponds to a horizontal reference pixel adjacent to the encoding target block in a horizontal direction.

Note that in typical PDPC, a greater weight is applied to a reference pixel that is closer to a prediction pixel, and a smaller weight is applied to a reference pixel that is farther from the prediction pixel or a weight of the reference pixel is set at 0 (that is, only the prediction pixel is used).

The corrector 172b corrects the prediction pixels pred(x, y) using, for example the following expression (1).

$$\text{pred}'(x,y) = (wL \cdot R_{-1,y} + wT \cdot R_{x,-1} - wTL \cdot R_{-1,-1} + wP \cdot \text{pred}(x,y) + 32) >> 6 \quad (1)$$

where x=0, . . . , M−1, y=0, . . . , N−1, M is a block width (width), and N is a block height (height).

Further, wL is a weight for the reference pixel on the left side, wT is a weight for the reference pixel on the upper side, wTL is a weight for the reference pixel on the upper left side, and wP is a weight for the prediction pixels before correction.

The weight controller 172c controls the weighted combining processing (in the present embodiment, PDPC) at the corrector 172b based on a type of transform to be applied in the orthogonal transform processing.

For example, the weight controller 172c controls the weight wL for the reference pixel $(R_{-1,\,y})$ on the left side based on the type of transform to be applied in the horizontal transform processing. Further, the weight controller 172c controls the weight wT for the reference pixel $(R_{x,\,-1})$ on the upper side based on the type of transform to be applied in the vertical transform processing.

Specifically, a case is assumed at the weight controller 172c where the type of transform to be applied in the horizontal transform processing is the first type (in the present embodiment, DCT 8) in which an impulse response $T_0(j)$ includes a basis that monotonically decreases (where j=0, . . . , N−1). In this case, the weight controller 172c makes the weight wL for the reference pixel $(R_{-1,\,y})$ on the left side smaller. Further, in a case where a type of transform to be applied in the vertical transform processing is the first type, the weight controller 172c makes the weight wT for the reference pixel $(R_{x,\,-1})$ on the upper side smaller. Note that "making the weight smaller" may be making the weight zero. In other words, control of the weighted combining processing based on the control flag includes at least partially preventing execution of the weighted combining processing.

Meanwhile, in a case where a type of transform to be applied in the horizontal transform processing is the second type (in the present embodiment, DST 7) in which an impulse response $T_0(j)$ includes a basis that monotonically increases (where j=0, . . . , N−1), the weight controller 172c makes the weight wL for the reference pixel $(R_{-1,\,y})$ on the left side greater. Further, in a case where the type of transform to be applied in the vertical transform processing is the second type, the weight controller 172c makes the weight wT for the reference pixel $(R_{x,\,-1})$ on the upper side greater.

Here, a specific example of operation of the weight controller 172c will be described. The weight controller 172c determines the above-described weights wL, wT, wTL and wP in accordance with the type of transform (control flag) determined by the transform determiner 180 and relative positions (x, y) of the prediction pixels based on a position of an upper left pixel of the prediction block.

First, the weight controller 172c determines k(x) through the following expression (2) in accordance with the type of transform (control flag) determined by the transform determiner 180.

[Expression 1]

$$k(x) = \begin{cases} -a & \text{if } x == 0 (DST7) \\ a & \text{if } x == 1 (DCT8) \\ 0 & \text{otherwise} (DCT2) \end{cases} \quad (2)$$

where a is an arbitrary positive integer and may be a fixed value determined in advance by a system or may be a variable value that is stream-output by the entropy encoder 130.

Second, the weight controller 172c determines the weights wL, wT, wTL and wP through the following expression (3) in accordance with k(x) determined through expression (2).

[Expression 2]

$$\text{scale} = (\text{Log 2(width)} + \text{Log 2(height)} + 2) >> 2$$

$$wT = (32 >> ((y<<1) >> \text{scale})) >> k(MTS\_\text{Ver\_flag})$$

$$wL = (32 >> ((x<<1) >> \text{scale})) >> k(MTS\_\text{Ver\_flag})$$

$$wTL = -(wT>>4 + wL>>4)$$

$$wP = 64 - wL - wT - wLT \quad (3)$$

where width and height respectively represent a width and a height of the encoding block target, and x and y represent relative pixel positions from an upper left coordinate of the encoding target block.

As indicated in expression (3), in a case where the DST 7 is applied in the horizontal direction, a value of wL becomes greater, which increases influence of correction by the reference pixels adjacent in the horizontal direction. Thus, energy of a prediction residual near a block boundary in the horizontal direction becomes smaller, and an effect of entropy reduction by application of the DST 7 becomes greater.

In a similar manner, in a case where the DST 7 is applied in the vertical direction, a value of wT becomes grater, which increases influence of correction by the reference pixels adjacent in the vertical direction. Thus, energy of a prediction residual near a block boundary in the vertical direction becomes smaller, and an effect of entropy reduction by application of the DST 7 becomes greater.

Meanwhile, in a case where the DCT 8 is applied in the horizontal direction, a value of wL becomes smaller, which decreases influence of correction by the reference pixels adjacent in the horizontal direction. It is therefore possible to prevent increase in entropy in a case where the PDPC and the DCT 8 are applied in conjunction with each other.

In a similar manner, in a case where the DCT 8 is applied in the vertical direction, a value of wT becomes smaller, which decreases influence of correction by the reference pixels adjacent in the vertical direction. It is therefore possible to prevent increase in entropy in a case where the PDPC and the DCT 8 are applied in conjunction with each other.

<Configuration of Image Decoding Device>

Figure 6:
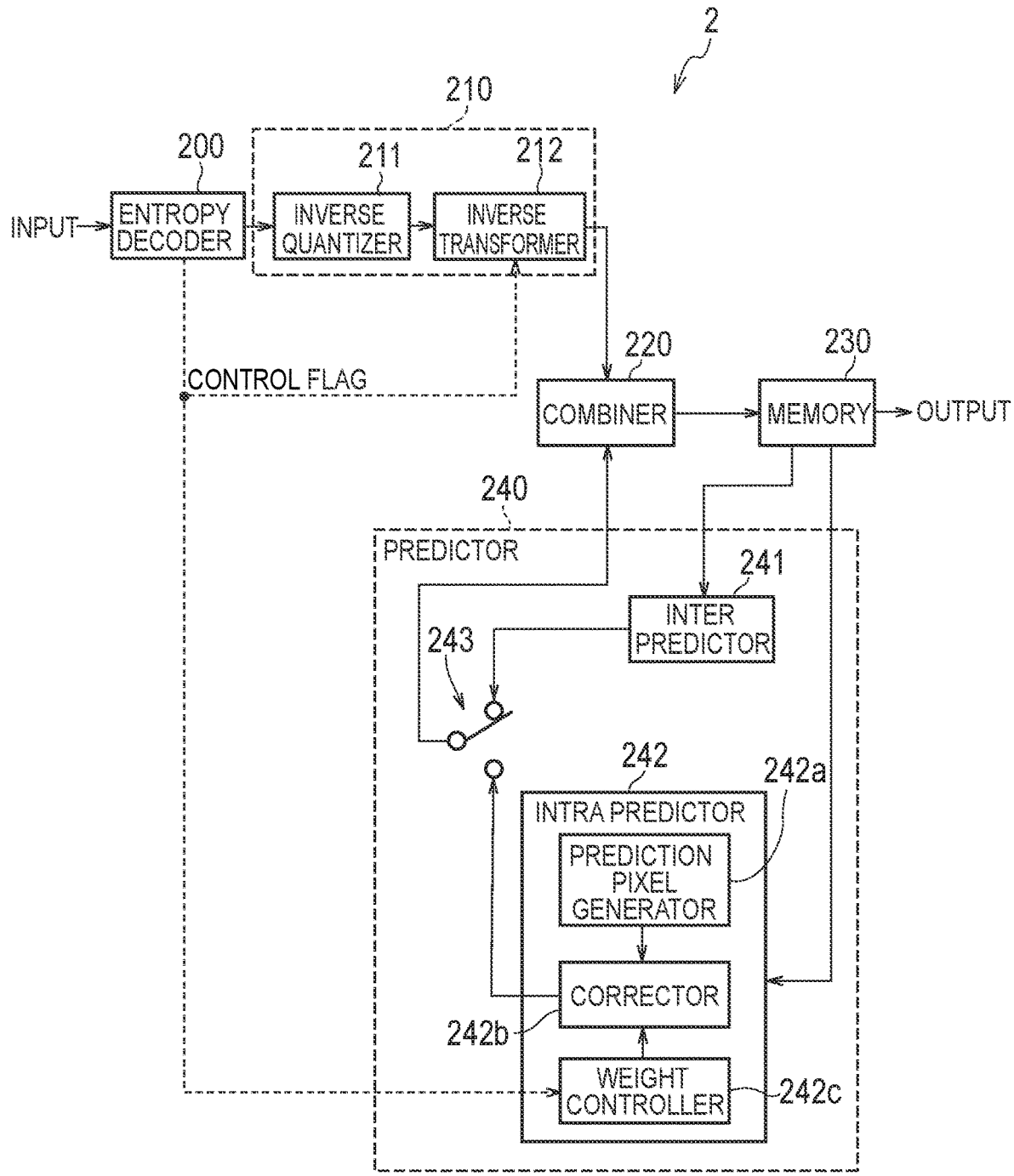
FIG. 6 is a diagram illustrating a configuration of an image decoding device according to the embodiment.

An image decoding device according to the present embodiment will be described next. FIG. 6 is a view illustrating a configuration of an image decoding device 2 according to the present embodiment.

As illustrated in FIG. 6, the image decoding device 2 includes an entropy decoder 200, an inverse quantizer/inverse transformer 210, a combiner 220, a memory 230, and a predictor 240.

An entropy decoder 200 decodes the encoded data generated by the image encoding device 1 and outputs the quantization transform coefficient to an inverse quantizer/inverse transformer 210. Further, the entropy decoder 200 acquires a syntax regarding prediction (intra prediction and inter prediction) and outputs the acquired syntax to a predictor 240.

Further, the entropy decoder 200 acquires the above-described control flag and outputs the acquired control flag to an inverse transformer 212 and a weight controller 242c. In other words, the entropy decoder 200 decodes the control flag that is entropy encoded as control information of transform processing on an encoding side.

The inverse quantizer/inverse transformer 210 performs inverse quantization processing and inverse orthogonal transform processing in units of the decoding target block. The inverse quantizer/inverse transformer 210 includes an inverse quantizer 211 and an inverse transformer 212.

The inverse quantizer 211 performs inverse quantization processing corresponding to the quantization processing performed by the quantizer 122 of the image encoding device 1. The inverse quantizer 211 restores the transform coefficient of a decoding target block by inversely quantizing the quantization transform coefficient input from the entropy decoder 200 using the quantization parameter and the quantization matrix and outputs a restoration transform coefficient that is the restored transform coefficient to an inverse transformer 212.

The inverse transformer 212 performs inverse orthogonal transform processing corresponding to the orthogonal transform processing performed by the transformer 121 of the image encoding device 1 based on the control flag input from the entropy decoder 200. Specifically, the inverse transformer 212 performs horizontal transform processing that is inverse orthogonal transform processing in the horizontal direction and vertical transform processing that is inverse orthogonal transform processing in the vertical direction. The inverse transformer 212 also functions as an inverse transform controller that controls inverse transform processing to be performed on the transform coefficient corresponding to the decoding target block based on the control flag.

The inverse transformer 212 restores a prediction residual by performing inverse orthogonal transform processing on the restoration transform coefficient input from the inverse quantizer 211 and outputs a restoration prediction residual that is the restored prediction residual to a combiner 220.

The combiner 220 reconstructs (decodes) an original block by combining the restoration prediction residual input from the inverse transformer 212 and the prediction block input from the predictor 240 in pixel unit and outputs the decoded image (reconstructed block) in block unit to a memory 230.

The memory 230 stores the decoded image inputted from the combiner 220. The memory 230 stores decoded images in units of frames. The memory 230 outputs the decoded images in units of frames to an outside of the image decoding device 2. Note that a loop filter may be provided between the combiner 220 and the memory 230.

The predictor 240 performs prediction in units of the decoding target block. The predictor 240 includes an inter predictor 241, an intra predictor 242 and a switch 243.

The inter predictor 241 predicts the decoding target block through inter prediction using the decoded image stored in the memory 230 as a reference image. The inter predictor 241 generates an inter prediction block by performing inter prediction in accordance with the syntax input from the entropy decoder 200, a motion vector, or the like, and outputs the generated inter prediction block to the switch 243.

The intra predictor 242 predicts the decoding target block through intra prediction based on the syntax input from the entropy decoder 200 with reference to the decoded image stored in the memory 230. By this means, the intra predictor 242 generates an intra prediction block and outputs the generated intra prediction block to the switch 243.

The switch 243 switches the prediction block between the inter prediction block input from the inter predictor 241 and the intra prediction block input from the intra predictor 242 and outputs one of the prediction blocks to the combiner 220.

In the present embodiment, the intra predictor 242 includes a prediction pixel generator 242a, a corrector 242b and a weight controller 242c. The prediction pixel generator 242a, the corrector 242b and the weight controller 242c operate in a similar manner to the prediction pixel generator 172a, the corrector 172b and the weight controller 172c of the image encoding device 1.

Specifically, the prediction pixel generator 242a predicts respective pixel values within the decoding target block through intra prediction in the intra prediction mode indicated by the syntax input from the entropy decoder 200. Further, the prediction pixel generator 242a generates a prediction block including prediction pixels and outputs the generated prediction block to the corrector 242b.

The corrector 242b corrects the prediction pixels by performing weighted combining processing dependent on positions of the prediction pixels on the prediction pixels within the prediction block input from the prediction pixel generator 242a and reference pixels adjacent to the decoding target block. The corrector 242b outputs the corrected prediction block (intra prediction block) including the corrected prediction pixels to the switch 173. In the present embodiment, the corrector 242b corrects the prediction pixels within the prediction block through the PDPC indicated in expression (1) described above.

The weight controller 242c controls the weighted combining processing (in the present embodiment, PDPC) at the corrector 242b based on a type of transform to be applied in the orthogonal transform processing.

For example, the weight controller 242c controls the weight wL for the reference pixel ($R_{-1, y}$) on the left side based on a type of transform to be applied in the horizontal transform processing. Further, the weight controller 242c controls the weight wT for the reference pixel ($R_{x, -1}$) on the upper side based on a type of transform to be applied in the vertical transform processing. Specific operation of the weight controller 242c is similar to the operation of the weight controller 172c of the image encoding device 1 described above.

<Operation Flow of Intra Prediction>

An example of operation flow of intra prediction according to the present embodiment will be described next. While operation of intra prediction at the image encoding device 1 is similar to operation of intra prediction at the image decoding device 2, here, operation of intra prediction will be described using an example of the operation of the intra prediction (intra predictor 172) at the image encoding device 1. FIG. 7 is a view illustrating an example of operation flow of the intra predictor 172 according to the present embodiment.

As illustrated in FIG. 7, in step S1, the prediction pixel generator 172a predicts respective pixel values within the encoding target block through intra prediction using one of the above-described intra prediction modes. Then, the prediction pixel generator 172a generates a prediction block including prediction pixels and outputs the generated prediction block to the corrector 172b.

In step S2, the weight controller 172c determines the weights wL, wT, wTL and wP to be used in the weighted combining processing (in the present embodiment, PDPC) at the corrector 172b through expression (2) and expression (3) described above in accordance with the type of transform (control flag) to be applied in the orthogonal transform processing and relative positions (x, y) of the prediction pixels based on a position of an upper left pixel of the prediction block. Note that order of step S1 and step S2 may be reverse.

In step S3, the corrector 172b corrects the prediction pixels pred(x, y) through the weighted combining processing through expression (1) described above using the weights wL, wT, wTL and wP determined by the weight controller 172c and obtains the corrected prediction pixels pred'(x, y).

In this manner, at the image encoding device 1 according to the present embodiment, the intra predictor 172 includes the weight controller 172c that controls the weighted combining processing at the corrector 172b based on the type of transform to be applied in the orthogonal transform processing.

Further, at the image decoding device 2 according to the present embodiment, the intra predictor 242 includes the weight controller 242c that controls the weighted combining processing at the corrector 242b based on the type of transform to be applied in the inverse orthogonal transform processing.

Thus, the prediction block predicted through intra prediction can be appropriately corrected while the type of transform is taken into account, so that it is possible to improve encoding efficiency.

<Modified Example 1 of Operation of Weight Controller>

Modified example 1 of the operation of the weight controllers 172c and 242c will be described next. The operation of the weight controller 172c is similar to the operation of the weight controller 242c, and thus, the operation will be described here using an example of the operation of the weight controller 172c.

In the present modified example, in a case where the DST 7 is applied in the horizontal direction and in the vertical direction (that is, in a case where both MTS_Hor_flag and MTS_Ver_flag are 0), the weight controller 172c determines the weights wL, wT, wTL and wP through the following expression (4).

[Expression 3]

$$scale=(Log\ 2(width)+Log\ 2(height)+2)>>2$$

$$wT=32>>((y<<1)>>scale))$$

$$wL=32>>((x<<1)>>scale))$$

$$wTL=-(wT>>4+wL>>4)$$

$$wP=64-wL-wT-wLT \quad (4)$$

where width and height respectively represent the width and the height of the encoding target block, and x and y represent relative pixel positions from an upper left coordinate of the encoding target block.

In a case where the DST 7 is applied in the horizontal direction and the DCT 8 is applied in the vertical direction (that is, in a case where MTS_Hor_flag=1, and MTS_Ver_flag=0), the weight controller 172c determines the weights wL, wT, wTL and wP through the following expression (5).

[Expression 4]

$$wT=0$$

$$wL=32>>((x<<1)>>scale)$$

$$wTL=wL$$

$$wP=64-wT-wT-wLT \quad (5)$$

In a case where the DCT 8 is applied in the horizontal direction, and the DST 7 is applied in the vertical direction (that is, in a case where MTS_Hor_flag=0, and MTS_Ver_flag=1), the weight controller 172c determines the weights wL, wT, wTL and wP through the following expression (6).

[Expression 5]

$$wT=32>>((y<<1)>>scale)$$

$$wL=0$$

$$wTL=wT$$

$$wP=64-wL-wT-wLT \quad (6)$$

In a case where the DCT 8 is applied in the horizontal direction and in the vertical direction (that is, in a case where both MTS_Hor_flag and MTS_Ver_flag are 1), the weight controller 172c determines the weights wL, wT, wTL and wP through the following expression (7). By this means, the weight controller 172c performs control so that correction is not performed.

[Expression 6]

$$wT-wL=wTL=0$$

$$wP=64 \quad (7)$$

<Modified Example 2 of Operation of Weight Controller>

Modified example 2 of the operation of the weight controllers 172c and 242c will be described next. The operation of the weight controller 172c is similar to the operation of the weight controller 242c, and thus, the operation will be described here using an example of the operation of the weight controller 172c.

In the present modified example, the weight controller 172c controls the weighted combining processing (PDPC) based on the type of transform to be applied in the orthogonal transform processing and a size of the encoding target block.

In a case where the block size is large, energy distribution of the prediction residual is less affected by the weighted combining processing (PDPC), and even in a case where the DCT 8 is applied, a problem of increase in entropy by the PDPC is less likely to occur.

Thus, the weights in accordance with the type of transform to be applied in the orthogonal transform processing may be controlled only in a case where the block size is less than a threshold. For example, the weight controller 172c uses the following expression (8) that is obtained by modifying expression (1) described above.

[Expression 7]

$$k(x) = \begin{cases} -a & \text{if } x == 0(DST7) \text{ \&\& width} * \text{height} < Tr \\ a & \text{if } x == 1(DCT8) \text{ \&\& width} * \text{height} < Tr \\ 0 & \text{otherwise}(DCT2) \end{cases} \quad (8)$$

where width and height respectively represent the width and the height of the encoding target block, and Tr represents a threshold.

Other Embodiments

An example has been described in the above-described embodiment and the modified examples where orthogonal transform is applied in the horizontal direction and in the vertical direction. However, the present disclosure can be also applied in a case where orthogonal transform is applied in one of the horizontal direction and the vertical direction, if the orthogonal transform to be applied in one of the directions includes a basis having characteristics of monotonical increasing or monotonical decreasing as described above.

Further, an example has been described in the above-described embodiment and the modified examples where the decoding target block (reference block) to be referred to upon intra prediction is located on the upper side and on the left side of the encoding target block. However, a position of the decoding target block to be referred to upon intra prediction is not limited to the upper side of the encoding target block and may be a lower side of the encoding target block. Further, the position of the decoding target block to be referred to upon intra prediction is not limited to the left side of the encoding target block and may be a right side of the encoding target block.

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The image encoding device 1 may be embodied as a semiconductor integrated circuit (chipset, SoC, etc.) by integrating the circuits that execute the respective operations of the image encoding device 1. The image decoding device 2 may be embodied as a semiconductor integrated circuit (chipset, SoC, etc.) by integrating the circuits that execute the respective operations of the image decoding device 2.

The embodiments have been described in detail above with reference to the drawings. Specific configurations are not limited to the above-described configurations, and various design changes, and the like are possible within the scope not deviating from the gist.

The invention claimed is:

1. An image decoding device that decodes a decoding target block obtained by dividing and encoding an image, the image decoding device comprising:
    an entropy decoder configured to decode a control flag that is entropy encoded on an encoding side as control information of transform processing;
    an inverse transform controller configured to control inverse transform processing to be performed on a transform coefficient corresponding to the decoding target block based on the control flag;
    an inverse transformer configured to perform inverse transform processing on the transform coefficient corresponding to the decoding target block based on control by the inverse transform controller; and
    an intra predictor configured to predict the decoding target block through intra prediction to generate a prediction block, wherein
    the intra predictor includes:
    a combining processing controller configured to control weighted combining processing dependent on positions of prediction pixels within the prediction block based on the control flag; and
    a corrector configured to correct the prediction pixels by performing the weighted combining processing on reference pixels adjacent to the decoding target block and the prediction pixels,
    the weighted combining processing is a processing of correcting prediction pixels within the prediction block by weighting a reference pixel on an upper side of the prediction block, a reference pixel on a left side of the prediction block, and a reference pixel on an upper left side of the prediction block, at specific ratios depending on coordinates of the prediction pixels, and
    in a case where a type of transform applied to the inverse transform processing is a predetermined type including a basis that impulse response is monotonically increasing, the combining processing controller is configured to increase a weight for a reference pixel adjacent to the decoding target block, compared to a case where the type is not the predetermined type.

2. A non-transitory computer-readable storage medium with an executable program stored thereon, wherein the program causes a computer to function as the image decoding device according to claim 1.

\* \* \* \* \*